(12) United States Patent
Moulin et al.

(10) Patent No.: US 10,780,929 B2
(45) Date of Patent: Sep. 22, 2020

(54) AUTOMATED GUIDED TROLLEY FOR THE TRANSPORT AND/OR HANDLING OF A LOAD

(71) Applicant: EXOTEC SOLUTIONS, Lille (FR)

(72) Inventors: Romain Moulin, Lille (FR); Renaud Heitz, Villeneuve d'Ascq (FR)

(73) Assignee: EXOTEC SOLUTIONS, Lille (FR)

( * ) Notice: Subject to any disclaimer, the term of this patent is extended or adjusted under 35 U.S.C. 154(b) by 43 days.

(21) Appl. No.: 16/345,947

(22) PCT Filed: Apr. 9, 2018

(86) PCT No.: PCT/EP2018/059020
§ 371 (c)(1),
(2) Date: Apr. 29, 2019

(87) PCT Pub. No.: WO2018/189106
PCT Pub. Date: Oct. 18, 2018

(65) Prior Publication Data
US 2019/0263463 A1 Aug. 29, 2019

(30) Foreign Application Priority Data

Apr. 14, 2017 (FR) ..................... 17 53292

(51) Int. Cl.
*B62D 61/12* (2006.01)
*B62D 37/00* (2006.01)
(Continued)

(52) U.S. Cl.
CPC .............. *B62D 61/12* (2013.01); *B62D 37/00* (2013.01); *B62D 61/02* (2013.01); *B62D 61/04* (2013.01);
(Continued)

(58) Field of Classification Search
CPC . A61G 5/043; B60K 2007/0038; B62D 61/12
(Continued)

(56) References Cited

U.S. PATENT DOCUMENTS 4,128,137 A * 12/1978 Booth ................ B62D 7/00
180/6.5
4,515,235 A * 5/1985 Yamamoto ............... B62D 1/28
16/44
(Continued)

FOREIGN PATENT DOCUMENTS

FR 2818624 A1 6/2002
JP 2004249895 A 9/2004

OTHER PUBLICATIONS

International Search Report dated Jul. 5, 2018 for corresponding International Application No. PCT/EP2018/059020, filed Apr. 9, 2018.
(Continued)

*Primary Examiner* — Jeffrey J Restifo
(74) *Attorney, Agent, or Firm* — David D. Brush; Westman, Champlin & Koehler, P.A.

(57) ABSTRACT

An automated guided trolley for transporting and/or handling a load. The trolley has a main frame for receiving the load and a supporting frame having two walking beams extending respectively towards the front and the rear of the trolley. The walking beams are mounted rotatably with respect to the main frame respectively about a first axis and a second axis and such a walking beam includes elements for securing one arm of one walking beam to one arm of the other walking beam and for supporting the first of these arms on the other arm.

10 Claims, 3 Drawing Sheets

(51) Int. Cl.
    *B62D 61/02*    (2006.01)
    *B62D 63/04*    (2006.01)
    *B62D 61/04*    (2006.01)
    *B62D 63/02*    (2006.01)
    *G05D 1/02*     (2020.01)
(52) U.S. Cl.
    CPC ........... *B62D 61/125* (2013.01); *B62D 63/02*
            (2013.01); *B62D 63/04* (2013.01); *G05D*
            *1/021* (2013.01); *G05D 2201/0216* (2013.01)
(58) Field of Classification Search
    USPC ..................................................... 180/65.51
    See application file for complete search history.

(56) References Cited

U.S. PATENT DOCUMENTS

| | | | | |
|---|---|---|---|---|
| 5,201,819 A * | 4/1993 | Shiraishi | ................ | B60G 5/00 180/168 |
| 5,988,306 A * | 11/1999 | Ooishi | ................ | B62D 1/28 180/168 |
| 6,070,898 A * | 6/2000 | Dickie | ................ | A61G 5/043 180/65.1 |
| 6,129,165 A * | 10/2000 | Schaffner | ................ | A61G 5/042 180/65.1 |
| 6,196,343 B1 * | 3/2001 | Strautnieks | ................ | A61G 5/1078 180/22 |
| 6,220,382 B1 * | 4/2001 | Kramer, Jr. | ................ | A61G 5/043 180/65.51 |
| 6,554,086 B1 * | 4/2003 | Goertzen | ................ | A61G 5/043 180/65.1 |
| 6,564,890 B2 * | 5/2003 | Coveyou | ................ | B62D 53/005 180/19.1 |
| 6,851,711 B2 * | 2/2005 | Goertzen | ................ | A61G 5/043 280/124.104 |
| 7,021,641 B2 * | 4/2006 | Wu | ................ | A61G 5/042 280/250.1 |
| 7,066,290 B2 * | 6/2006 | Fought | ................ | A61G 5/043 180/65.51 |
| 7,090,042 B2 * | 8/2006 | Coveyou | ................ | B62D 51/04 180/19.2 |
| 7,175,193 B2 * | 2/2007 | Wu | ................ | A61G 5/043 280/304.1 |
| 7,264,272 B2 * | 9/2007 | Mulhern | ................ | A61G 5/043 180/65.1 |
| 7,306,247 B2 * | 12/2007 | Wu | ................ | A61G 5/043 180/65.51 |
| 7,314,220 B2 * | 1/2008 | Turturiello | ................ | A61G 5/042 180/907 |
| 7,370,876 B2 * | 5/2008 | Hsu | ................ | A61G 5/043 180/65.1 |
| 7,380,824 B2 * | 6/2008 | Chen | ................ | B60B 33/045 280/755 |
| 7,506,709 B2 * | 3/2009 | Kiwak | ................ | A61G 5/043 180/65.1 |
| 7,721,829 B2 * | 5/2010 | Lee | ................ | B25J 5/007 180/6.48 |
| 7,896,394 B2 * | 3/2011 | Jackson | ................ | B60G 21/045 280/755 |
| 8,210,556 B2 * | 7/2012 | Zhou | ................ | A61G 5/043 280/304.1 |
| 8,286,738 B2 * | 10/2012 | Cheng | ................ | A61G 5/043 180/24.02 |
| 8,298,039 B2 * | 10/2012 | Liu | ................ | A63H 17/262 446/465 |
| 8,789,632 B2 * | 7/2014 | Maurer | ................ | A61G 5/042 180/24.02 |
| 8,851,214 B2 * | 10/2014 | Mirzaie | ................ | A61G 5/1078 180/65.1 |
| 9,351,888 B2 * | 5/2016 | Wu | ................ | A61G 5/1078 |
| 10,336,380 B2 * | 7/2019 | Sakashita | ................ | B62D 63/02 |
| 10,667,970 B2 * | 6/2020 | Van de Wal | ................ | A61G 5/043 |
| 10,683,168 B2 * | 6/2020 | Moulin | ................ | B65G 1/0485 |
| 2003/0168264 A1 * | 9/2003 | Goertzen | ................ | A61G 5/1089 180/65.1 |
| 2007/0023209 A1 * | 2/2007 | Wu | ................ | B60G 21/045 180/65.1 |

OTHER PUBLICATIONS

Written Opinion of the International Searching Authority dated Jul. 5, 2018 for corresponding International Application PCT/EP2018/059020, filed Apr. 9, 2018.

English translation of the International Written Opinion of the International Searching Authority dated Jul. 12, 2018 for corresponding International Application No. PCT/EP2018/059020, filed Apr. 9, 2018.

* cited by examiner

AUTOMATED GUIDED TROLLEY FOR THE TRANSPORT AND/OR HANDLING OF A LOAD

1. CROSS-REFERENCE TO RELATED APPLICATIONS

This Application is a Section 371 National Stage Application of International Application No. PCT/EP2018/059020, filed Apr. 9, 2018, the content of which is incorporated herein by reference in its entirety, and published as WO 2018/189106 on Oct. 18, 2018, not in English.

2. FIELD OF THE INVENTION

The field of the invention is that of logistics.

More precisely, the invention relates to an automatic guided trolley.

In particular, the invention finds an application in handling and transport of parts or products in a warehouse.

3. STATE OF THE ART

The significant growth of online business has directly impacted the control flow management strategies and the handling of products in a logistic warehouse.

It is well known to automate transport tasks in a warehouse to gain speed of delivery.

For example, it was considered to use automatic guided trolleys to transport crates containing products to an order collection area. There are also known to be automated guided trolleys used to transport racks from a warehouse to a product collection point by an operator in these racks.

In many cases, the frame of these automated guided trolleys is connected by four-wheel suspensions.

A disadvantage of known automated guided trolleys is that their mobility is affected when the load on the different wheels of the vehicle is not balanced due to uneven distribution of the products in the crate or on the shelf being transported, or when they are driven on uneven ground.

In addition, in order to avoid that, in the absence of a load to be transported, the grip of the wheels on the ground is greatly reduced, and limits the acceleration and deceleration capacities of the trolley, efforts are also being made to increase the weight of the automated guided trolley to pre-compress the suspension systems.

This has the disadvantage of increasing the energy required to move the trolley and thus reducing its autonomy.

Another disadvantage of these known automated guided trolleys is that when the load is too large, the suspensions are compressed to their maximum. The weight distribution of the load carried by the platform is then transmitted as it is to the wheels. The weight of the load cannot then be distributed over each of the wheels.

Among these known automatic guided trolleys, some can be configured to have bogie-mounted axles, one at the front, and the other at the rear of a crate or car.

This bogie-mounted automated guided trolley technique has the same disadvantages as the previous techniques.

Another disadvantage of these bogie-mounted automated guided trolleys is that they cannot rotate around themselves.

4. SUMMARY OF THE INVENTION

An exemplary embodiment of the present disclosure relates to an automated guided trolley for transporting and/or handling a load, comprising a main frame for receiving said load and a supporting frame comprising a first walking beam and a second walking beam extending respectively forward and backward of said trolley or vice versa.

The invention thus concerns an automated guided vehicle, also known by the acronym AGV. This automated guided vehicle can be equipped with one or more object gripping arms, without departing from the framework of the invention.

It should be noted that throughout the description of this patent application, reference is made to an advancing direction of the trolley when using the terms front, rear, right and left of the trolley.

According to the invention, said first and second walking beams are pivoted relative to the main frame respectively about a first axis and a second axis, said first walking beam having a first arm extending from said first axis towards the outside of said trolley, equipped with at least one idler wheel, and a second arm extending from said first axis towards the inside of said trolley, mounted on two differential drive wheels, said second walking beam having a first arm extending from said second axis towards the outside of said trolley, equipped with at least one idler wheel and a second arm extending from said second axis towards the inside of said trolley, and such an automated guided trolley comprises means for securing the second arm of said second walking beam to the second arm of said first walking beam comprising means for supporting said second arm of said second walking beam on the second arm of said first walking beam.

Thus, in a new way, the invention proposes to implement two walking beams to distribute the weight of the load carried by the main frame uniformly between the differential drive wheels and the idler wheels, whatever this load may be.

The use of walking beams also limits the weight of the automated guided trolley, which provides better performance in terms of autonomy and travel speed, in particular.

In addition, the load distribution is equally distributed between the front and rear, but also between the right and left of the trolley.

It should also be noted that the assembly of the main frame with the supporting frame is thus substantially isostatic.

According to a particular aspect of the invention, the differential drive wheels are mounted in the transverse plane of the trolley, or in other words the vertical median plane orthogonal to the longitudinal axis of the automated guided trolley, in order to increase their adherence and thus optimise the transfer of engine torque to the ground.

According to an advantageous embodiment of the invention, said bearing means comprise a pin extending substantially perpendicular to the second arm of said second walking beam, or vice versa to the second arm of said first walking beam, said pin at least partially penetrating into a hole formed in said second arm of said first walking beam, or vice versa in said second arm of said second walking beam, wider than said pin.

This provides a simple and inexpensive way to press the second arm of the second walking beam, or the second arm of the first walking beam, in a reversible manner either downward or upward.

According to a particular aspect of the invention, said hole is substantially oblong in shape and extends substantially in the longitudinal direction of the second arm in which it is formed.

Thus, when the walking beam carrying the pin pivots around its pivot axis relative to the main frame, the pin travels through an arc of a circle and moves in the hole by pushing on one of its inner faces.

In a particular embodiment of the invention, said pin includes a roller intended to rest on the edges of said hole.

This limits the friction of the pin in the hole, which reduces the wear of the pin and/or hole.

According to a preferential embodiment of the invention, said bearing means are housed substantially vertically on the axis of the differential drive wheels.

According to a particular embodiment of the invention, the said bearing means are housed under the axis of said two differential drive wheels.

According to a particularly advantageous embodiment of the invention, an automated guided trolley as described above comprises at least one stop mounted on said main frame opposite one of said walking beams, intended to limit the articulation of the supporting frame in relation to the main frame.

This prevents the differential drive wheels from coming into contact with the trolley structure, when running over bumps or holes over the ground, and from wearing out prematurely by friction with it.

According to a preferential embodiment of the invention, the two differential drive wheels are driven in rotation by two independently controlled motors, fixed to the same walking beam as the differential drive wheels.

Thus, the automated guided trolley is able to rotate on itself to make a change of direction.

According to an advantageous embodiment of the invention, at least one of the walking beams is equipped with two idler wheels mounted on it in symmetrical positions with respect to the sagittal plane of the trolley.

By moving the two idler wheels away from the sagittal plane, the trolley can then be guided by a ground guiding device, such as a line along which it travels on horseback.

Sagittal plane here refers to the vertical median plane passing through the longitudinal axis of the trolley.

According to an advantageous aspect of the invention, the position of said first axis and the position of said second axis are symmetrical with respect to the median plane of said trolley.

Favourably, the first and/or second axle is halfway between the drive wheel axle and the idler axle on the first or second walking beam, respectively.

5. LIST OF FIGURES

Other features and advantages of the invention will appear more clearly on reading the following description of an embodiment of the invention, given as a simple illustrative and non-limiting example, and the appended drawings among which:

6. DETAILED DESCRIPTION OF THE INVENTION

6.1 First Exemplary Embodiment of the Invention

Figure 1:
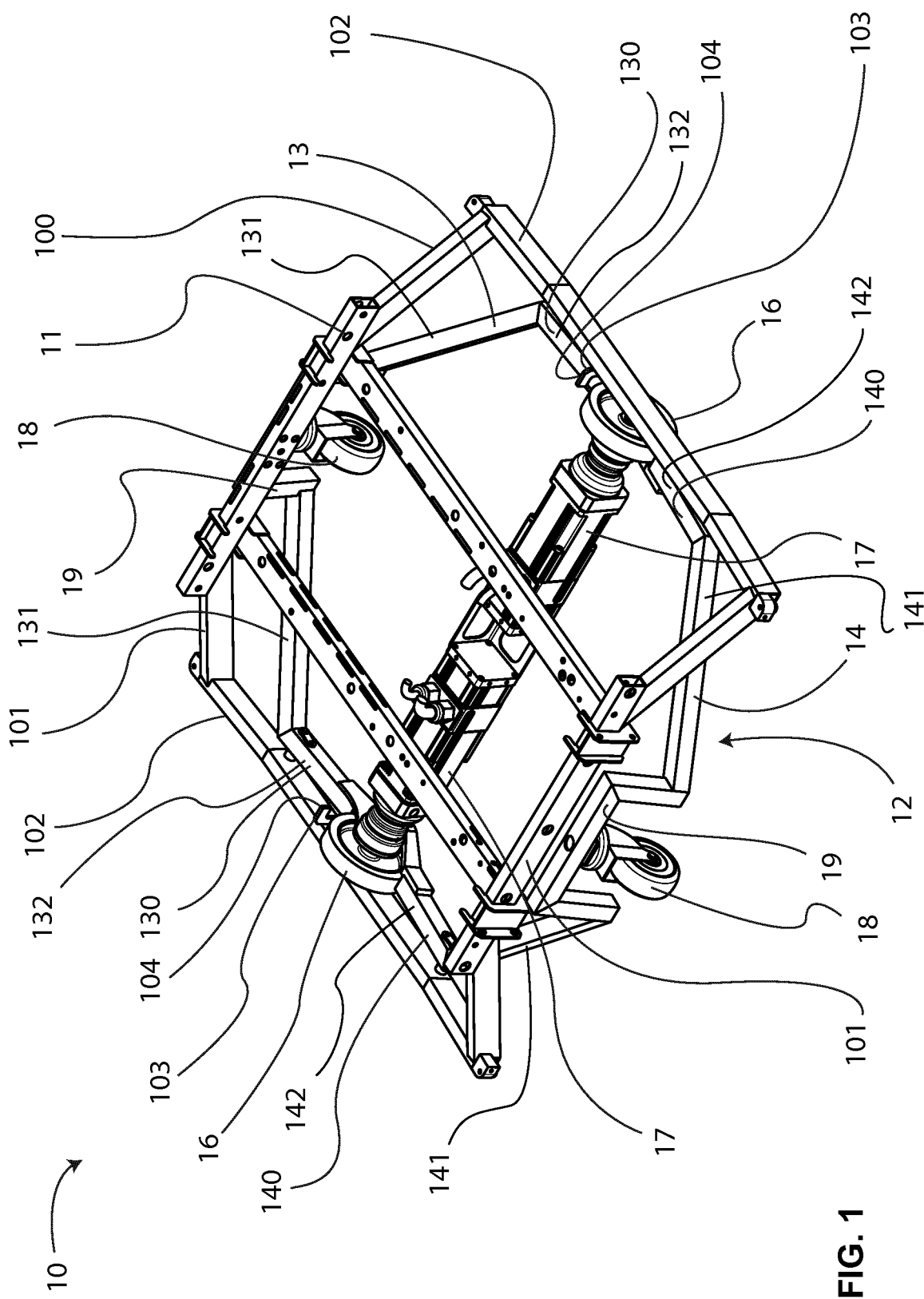
FIG. 1 is a perspective view of an exemplary embodiment of an automated guided trolley according to the invention.

FIG. 1 is a perspective view of an exemplary embodiment of an automated guided trolley 10 according to the invention, dedicated to the transport and/or handling of a load. This automated guided trolley 10 comprises a main frame 11 to receive a load supported by a supporting frame 12 ensuring the ground connection of the trolley 10.

This supporting frame 12 consists of a first walking beam 13 extending forward of the trolley 10 and a second walking beam 14 extending rearward of the trolley. Each walking beam 13, 14 consists of a "U" shaped frame with two lateral branches 130, 140 each extending according to the longitudinal orientation of the trolley towards the inside of it.

The first walking beam 13 is mounted on two driving wheels 16 with differential drive, the axis of which is located in the median plane of the supporting frame 12. The rotational drive of the two driving wheels 16 is provided by two independently controlled motors 17, fixed on the frame of the first walking beam 13 substantially at the proximal end of the second arm 130.

It should be noted that the differential drive of the two central driving wheels 16 by the 17 engines allows the trolley to move according to all types of paths programmed by a control module (not shown in FIG. 1) such as a straight line, a curve or even rotate on itself.

The first walking beam 13 and the second walking beam 14 are each equipped with an idler wheel 18. These idler wheels 18 are fixed at the distal ends of the walking beams 13, 14, in the sagittal plane of the trolley. To accommodate the idler wheel, each walking beam has a "U" shaped drop 19 that spans the idler wheel.

As shown in FIG. 1, the main frame 11 consists of a peripheral frame 100 with two cross members 101 connecting two side rails 102 to which a stop 103 is welded, substantially in the middle and front of the driving wheels 16.

To limit the upward travel of the first walking beam 13 at the driving wheels 16, each stop 103 has a ergot 104 overhanging a branch 130 of the first walking beam. Thus, the lowest point of the circumference of the driving wheels 16 which corresponds to the point of contact of the tread with the ground remains below the lowest point of the main frame 11. In addition, this prevents the highest point of the tread from coming into contact with the main frame 11 or the load. In addition, at the distal end of the trolley, the articulation of the first and second walking beam 14 is limited upwardly by the cross members 101 of frame 100, which act as a stop for each drop 19.

Figure 2:
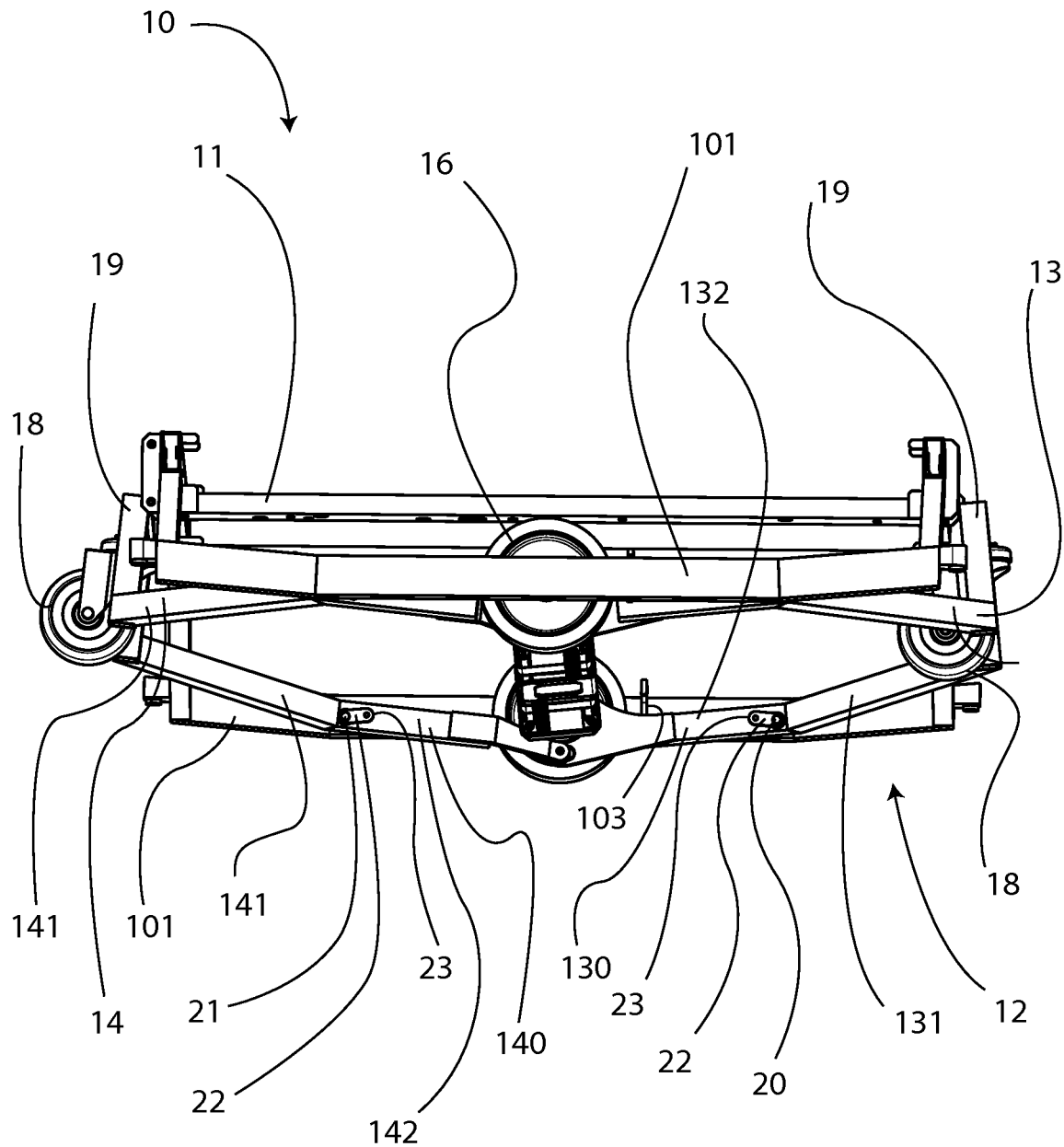
FIG. 2 is a perspective view of the underside of the automated guided trolley shown with reference to FIG. 1.
Figure 3:
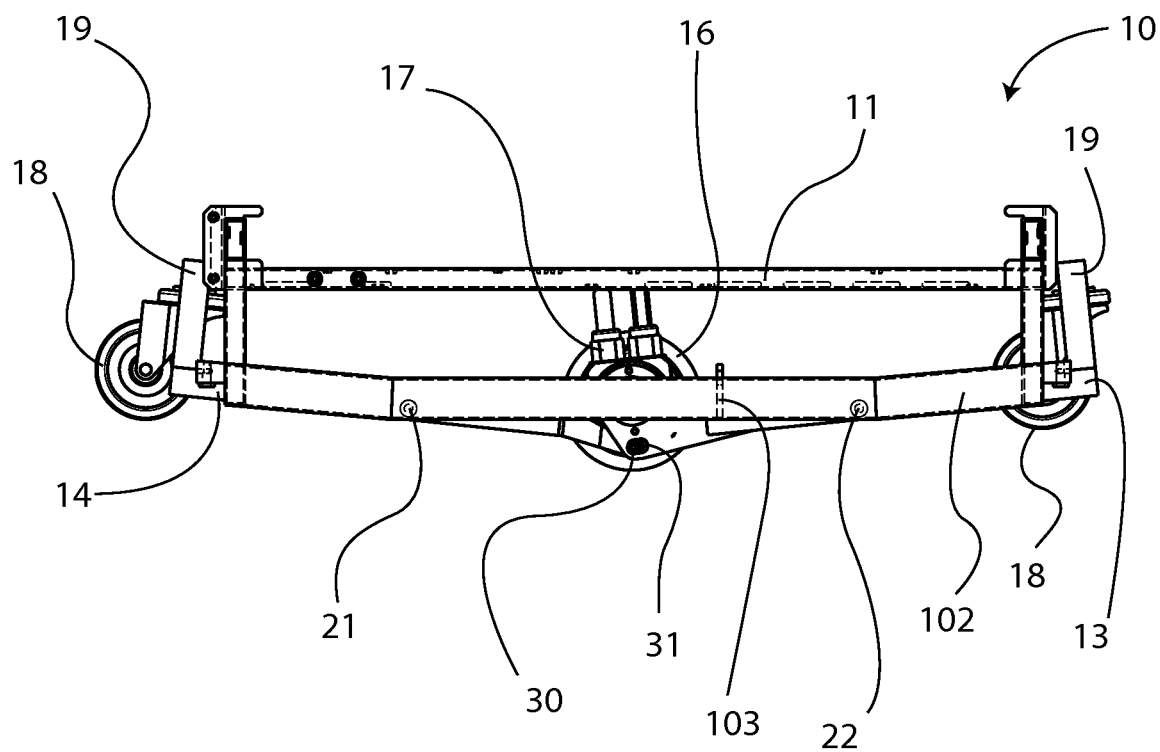
FIG. 3 is a view of one side of the automated guided trolley shown with reference to FIG. 1.

FIGS. 2 and 3 show the trolley from a perspective view, seen from below and from the side respectively, in order to make the articulation points between the main frame 11, the first walking beam 13 and the second walking beam 14 clearer.

In FIG. 2, it can be seen that each walking beam 13 or 14 of the supporting frame 12 is pivoted relative to the main frame 11, about a pair of axes 20 or 21, fixed to the side rail 102 of the main frame 11.

The axes of each pair of axes 20, 21 are aligned and located opposite each other on each side of the sagittal plane of the trolley. At their free end, they have a lug 22 forming a shoulder, held by a screw 23 at one of the lateral branches 130, 140.

Figure 4:
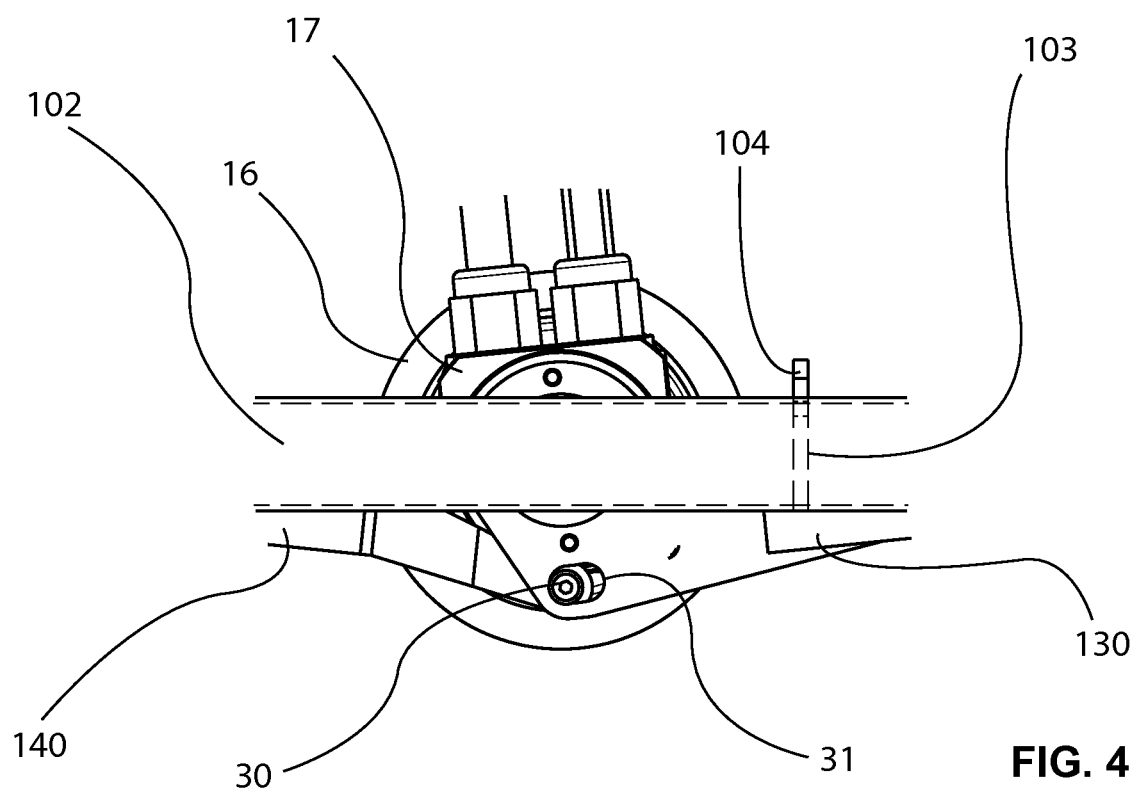
FIG. 4 is a view of another side of the automated guided trolley shown with reference to FIG. 1.

As shown in FIGS. 3 and 4, the axle pairs 20, 21 for pivoting the walking beams 13 and 14 relative to the main frame 11 are located approximately midway between the driving wheels 16 and the fastening points of the two idler wheels 18 to the walking beams 13, 14. Thus the load is approximately 50% distributed over the driving wheels 16 and 31% over each of the idler wheels 18.

Each lateral branch 130 or 140 has on either side of axes 20, 21 a first arm 131, 141, on which one of the idler wheels 16, and a second arm 132, 142, extending respectively towards the outside and towards the inside of the trolley, are mounted.

In FIG. 3, it can be seen that the second walking beam 14 is attached and supported on the first walking beam 13 substantially in the transverse median plane of the supporting trolley 12. This support is provided by a pin 30 fixed to each proximal end of each branch 140 of the second walking beam 14. Each pin 30 enters a hole which is in the form of an elongated hole 31 in each proximal end of each branch 130 of the first walking beam 13, substantially vertical to the axis of the driving wheels 16. It can also be seen that the longitudinal axis of each oblong hole 31 is oriented substantially in the longitudinal direction of the branch 130. Finally, the length of the elongated holes 31 is sized in such a way as to allow the rotation of the first and second walking beams 13, 14 with respect to the main trolley 11 within the limits of the articulation allowed by the crosspieces 101 and the stops 103.

6.2 Other Optional Features and Advantages of the Invention

In embodiment variants of the invention detailed above, the following can also be provided:
- that the second walking beam be integral with the first walking beam via at least one vertical rod that transmits the counter-reaction forces from the second walking beam on the first walking beam along the vertical axis;
- to distribute the load differently between the driving wheels and the idler wheels by moving the position of the pivot axes of the walking beams relative to the main frame, in order to promote the stability of the trolley or rather the adherence of the driving wheels;
- to equip each walking beam with two idler wheels, fixed to the body of the walking beam in symmetrical positions with respect to the transverse plane of the supporting frame.

An exemplary embodiment of the invention therefore particularly aims to overcome the disadvantages of the state of the art mentioned above.

More precisely, an exemplary embodiment of the invention aims to provide an automated guided trolley for the transport and/or handling of a load in which all the wheels adhere properly to the ground, whether the trolley is loaded or empty.

An exemplary embodiment of the invention provides such an automated guided trolley technique in which the adherence of the wheels to the ground is directly proportional to the weight transported.

An exemplary embodiment of also proposes such an automatic guided trolley technique that maintains the level of grip of the driving wheels, regardless of the distribution of the transported load.

An exemplary embodiment provides such an automated guided trolley technique that limits load transfer problems during the acceleration and deceleration phases.

An exemplary embodiment of the invention also aims to offer an automated guided trolley technique with increased energy autonomy.

An exemplary embodiment of the invention provides such an automatic guided trolley technique that is simple to implement, reliable and low-cost.

Although the present disclosure has been described with reference to one or more examples, workers skilled in the art will recognize that changes may be made in form and detail without departing from the scope of the disclosure and/or the appended claims.

The invention claimed is:

1. An automated guided trolley for transporting and/or handling a load, the automated guided trolley comprising:
   a main frame for receiving said load; and
   a supporting frame comprising a first walking beam and a second walking beam extending respectively forward and backward of said trolley or vice versa,
   said first and second walking beams being pivotally mounted with respect to the main frame respectively about a first axis and a second axis,
   said first walking beam having a first arm extending from said first axis towards an outside of said trolley, equipped with at least one idler wheel, and a second arm extending from said first axis towards an inside of said trolley, mounted on two differential drive wheels,
   said second walking beam having a first arm extending from said second axis towards the outside of said trolley, equipped with at least one further idler wheel and a second arm extending from said second axis towards the inside of said trolley,
   and a connection securing the second arm of said second walking beam to the second arm of said first walking beam, the connection comprising a support supporting said second arm of said second walking beam on the second arm of said first walking beam.

2. The automated guided trolley according to claim 1, wherein said support comprises a pin extending substantially perpendicular to the second arm of said second walking beam, or vice versa to the second arm of said first walking beam, said pin at least partially penetrating into a hole formed in said second arm of said first walking beam, or vice versa in said second arm of said second walking beam, wider than said pin.

3. The automated guided trolley according to claim 2, wherein said hole is substantially oblong in shape and extends substantially in the longitudinal direction of the second arm in which it is formed.

4. The automated guided trolley according to claim 2, wherein said pin comprises a roller intended to rest on the edges of said hole.

5. The automated guided trolley according to claim 1, wherein said support is housed substantially vertically on the axis of the differential drive wheels.

6. The automated guided trolley according to claim 5, wherein said support is housed under the axis of said two differential drive wheels.

7. The automated guided trolley according to claim 1, wherein the trolley further comprises at least one stop mounted on said main frame opposite one of said walking beams, arranged to limit articulation of the supporting frame with respect to the main frame.

8. The automated guided trolley according to claim 1, wherein said two differential drive wheels are driven in rotation by two independently controlled motors, fixed to the same walking beams as the differential drive wheels.

9. The automated guided trolley according to claim 1, wherein at least one of said walking beams is equipped with two idler wheels mounted thereon in positions symmetrical with respect to a sagittal plane of said trolley.

10. The automated guided trolley according to claim 1, wherein a position of said first axis and a position of said second axis are symmetrical with respect to a median plane of said trolley.

* * * * *